US010370100B2

(12) United States Patent
Rothhaar et al.

(10) Patent No.: US 10,370,100 B2
(45) Date of Patent: Aug. 6, 2019

(54) AERODYNAMICALLY ACTUATED THRUST VECTORING DEVICES

(71) Applicant: The United States of America as represented by the Administrator of the National Aeronautics and Space Administration, Washington, DC (US)

(72) Inventors: Paul M. Rothhaar, Yorktown, VA (US); William J. Fredericks, Williamsburg, VA (US); David D. North, Williamsburg, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 714 days.

(21) Appl. No.: 15/077,268

(22) Filed: Mar. 22, 2016

(65) Prior Publication Data

US 2016/0288903 A1 Oct. 6, 2016

Related U.S. Application Data

(60) Provisional application No. 62/137,546, filed on Mar. 24, 2015.

(51) Int. Cl.
*B64C 9/04* (2006.01)
*B64C 29/00* (2006.01)

(52) U.S. Cl.
CPC ............ *B64C 29/0033* (2013.01); *B64C 9/04* (2013.01); *Y02T 50/32* (2013.01); *Y02T 50/44* (2013.01)

(58) Field of Classification Search
CPC .............................. B64C 9/04; B64C 29/0033
See application file for complete search history.

(56) References Cited

U.S. PATENT DOCUMENTS

| 2,462,201 A | 2/1949 | Kilgore |
| 2,783,956 A | 3/1957 | Harriss |

(Continued)

FOREIGN PATENT DOCUMENTS

| EP | 2581308 A2 | 4/2013 |
| GB | 2497136 A | 6/2013 |

OTHER PUBLICATIONS

Bradley, M. et al., "NASA N+3 Subsonic Ultra Green Aircraft Research SUGAR Final Review," Apr. 20, 2010, http://aviationweek.typepad.com/files/boeing_sugar_phase_i_final_review_v5.pdf.

(Continued)

*Primary Examiner* — Brian M O'Hara
*Assistant Examiner* — Michael B. Kreiner
(74) *Attorney, Agent, or Firm* — Andrea Z. Warmbier; Robin W. Edwards; Mark P. Dvorscak

(57) ABSTRACT

A vehicle includes a wing and a control surface pivotably coupled to the wing and configured to pivot about a range of motion. A propulsor is coupled to the control surface and configured to rotate between a first position associated with a hover flight mode and a second position associated with a forward flight mode. The propulsor is aerodynamically actuated between the first position and the second position due to aerodynamics about the wing. The propulsor may rotate from an initial flight mode, such as a takeoff mode, to a second flight mode, such as a forward flight mode.

12 Claims, 8 Drawing Sheets

(56) References Cited

U.S. PATENT DOCUMENTS

| | | | |
|---|---|---|---|
| 2,959,373 A * | 11/1960 | Zuck | B64C 27/30 244/17.21 |
| 2,980,368 A | 4/1961 | Jakimiuk et al. | |
| 3,179,354 A * | 4/1965 | Alvarez-Calderon | B64C 23/00 244/12.4 |
| 3,545,701 A * | 12/1970 | Bertin | B64C 9/38 244/12.3 |
| 3,666,209 A * | 5/1972 | Taylor | B64C 29/0033 244/12.4 |
| 4,149,688 A | 4/1979 | Miller, Jr. | |
| 4,605,185 A | 8/1986 | Reyes | |
| 4,900,226 A | 2/1990 | De Vries | |
| 4,923,144 A * | 5/1990 | Eickmann | B64C 29/0033 244/48 |
| 4,928,907 A * | 5/1990 | Zuck | B64C 27/26 244/48 |
| 5,062,588 A * | 11/1991 | Garland | B64C 29/0066 244/12.4 |
| 5,082,204 A | 1/1992 | Croston | |
| 5,280,863 A * | 1/1994 | Schmittle | B64C 3/385 244/46 |
| 5,395,073 A * | 3/1995 | Rutan | B64C 3/385 244/38 |
| 5,509,623 A * | 4/1996 | Schmittle | B64C 3/385 244/113 |
| 5,765,777 A * | 6/1998 | Schmittle | B64C 3/385 244/17.25 |
| 5,769,359 A * | 6/1998 | Rutan | B64C 3/385 244/120 |
| 5,823,468 A | 10/1998 | Bothe | |
| 5,863,013 A * | 1/1999 | Schmittle | B64C 3/385 244/104 LS |
| 5,941,478 A * | 8/1999 | Schmittle | B64C 1/00 244/120 |
| 6,655,631 B2 * | 12/2003 | Austen-Brown | B64C 27/28 244/12.4 |
| 7,131,613 B2 | 11/2006 | Kelly | |
| 8,469,306 B2 | 6/2013 | Kuhn | |
| 8,733,690 B2 | 5/2014 | Bevirt | |
| 8,800,912 B2 | 8/2014 | Oliver | |
| 9,096,312 B2 | 8/2015 | Moxon | |
| 9,475,579 B2 * | 10/2016 | Fredericks | B64C 25/52 |
| 9,643,720 B2 * | 5/2017 | Hesselbarth | B64C 29/0033 |
| 9,694,911 B2 * | 7/2017 | Bevirt | B64D 27/24 |
| 9,902,486 B2 * | 2/2018 | Norden | B64C 3/385 |
| 2004/0118969 A1 | 6/2004 | MacCready et al. | |
| 2006/0157614 A1 * | 7/2006 | Simpson | B64C 3/385 244/6 |
| 2006/0254255 A1 | 11/2006 | Okai et al. | |
| 2008/0184906 A1 | 8/2008 | Kejha | |
| 2008/0230656 A1 * | 9/2008 | Kretchmer | B64C 3/38 244/7 R |
| 2011/0001020 A1 | 1/2011 | Forgac | |
| 2011/0315809 A1 | 12/2011 | Oliver | |
| 2012/0012692 A1 | 1/2012 | Kroo | |
| 2013/0094963 A1 | 4/2013 | Rolt | |
| 2017/0197700 A1 * | 7/2017 | Wainfan | B64D 27/24 |
| 2017/0297698 A1 * | 10/2017 | Alber | B64C 29/0033 |

OTHER PUBLICATIONS

Fredericks, William, J. et al., "Project Reimer III Greased Lightning Overview," NASA Aeronautics Presentation Slides, Jan. 28, 2013, pp. 1-17.

Busan, Ronald C. et al., "Enabling Advanced Wind-Tunnel Research Methods Using the NASA Langley 12-Foot Low Speed Tunnel," 14th AIAA Aviation Technology, Integration, and Operations Conference, Jun. 16-20, 2014, pp. 1-22.

Moore, Mark D. et al., "High-Speed Mobility Through On-Demand Aviation" AIAA Aviation Technology, Integration, and Operations Conference, Aug. 12-14, 2013, pp. 1-27, Los Angeles, CA.

Moore, Mark D., "High Speed Mobility Through On-Demand Aviation," Presentation Slides, AIAA Aviation Technology, Integration, and Operations Conference, Aug. 12-14, 2013, pp. 1-34, Los Angeles, CA.

Fredericks, William J. et al., "Benefits of Hybrid-Electric Propulsion to Achieve 4x Increase in Cruise Efficiency for a VTOL Aircraft," AIAA Aviation Technology, Integration, Operations Conference, Aug. 12-14, 2013, pp. 1-21, Los Angeles, CA.

* cited by examiner

AERODYNAMICALLY ACTUATED THRUST VECTORING DEVICES

CROSS-REFERENCE TO RELATED PATENT APPLICATION

This patent application claims the benefit of and priority to U.S. Provisional Patent Application No. 62/137,546, filed on Mar. 24, 2015, the contents of which are hereby incorporated by reference in their entirety.

STATEMENT REGARDING FEDERALLY SPONSORED RESEARCH OR DEVELOPMENT

The invention described herein was made in part by employees of the U.S. Government and may be manufactured and used by and for the Government of the U.S. for governmental purposes without the payment of any royalties thereon or therefore.

BACKGROUND OF THE INVENTION

Thrust vectoring is an essential feature for vehicles capable of transitioning in flight direction and/or transitioning between various types of flight modes, such as from a takeoff mode to a forward flight mode. In particular, propulsors (e.g., propellers, rotors, fans, ducted fans, or other thrust generating devices that accelerate air) may be designed to rotate or tilt about the vehicle to accomplish a transition in flight direction. Thrust vectoring devices provide a mechanism by which such propulsors move relative to the vehicle. Thrust vectoring devices may be employed in a number of vehicle types, including but not limited to vehicles configured for vertical takeoff and landing ("VTOL"), conventional takeoff and landing ("CTOL"), short takeoff and landing ("STOL"), and the like. Current thrust vectoring devices employ mechanically driven actuators to facilitate movement of the propulsors. With these current systems, a substantial amount of machinery, hardware and/or software may be required to appropriately engage the thrust vectoring, and often must work against freestream velocities around the vehicle to accomplish a change in flight mode and/or flight direction.

Prior art solutions for thrust vectoring system have not resolved the need for an approach to perform one or more of the above actions without drawbacks, e.g., mechanical/electrical complexity, size and weight constraints, and/or cost-prohibitive. Therefore, there is a need for thrust vectoring systems and methods that address one or more of the deficiencies described above amongst others.

BRIEF SUMMARY OF THE INVENTION

The present invention is related to systems and methods for thrust vectoring devices for aircraft vehicles and in particular relate to aerodynamically actuated thrust vectoring devices for tilt-wing or tilt-propulsor aircraft.

The following presents a general summary of aspects of this invention in order to provide a basic understanding of at least some aspects of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Vehicles employing thrust vectoring devices according to various aspects of the present disclosure may include one or more propulsors configured to tilt through a range of motion about a wing, or a wing configured to tilt through a range of motion and having one or more propulsors coupled to the wing and moving with the wing through the range of motion.

One embodiment of the invention is a thrust actuating device that includes a control surface pivotably attached to a wing and configured to pivot about a range of motion relative to the wing. A propulsor configured to provide thrust to a vehicle may be coupled to the control surface and configured to rotate between a first position associated with a hover flight mode and a second position associated with a forward flight mode. In particular, the propulsor may be aerodynamically actuated between the first position and the second position due to aerodynamic conditions about the wing.

Another embodiment of the invention is a vehicle may include a vehicle body, a wing coupled to the vehicle body, a control surface configured to pivot relative to the wing, and a series of propulsors coupled to the wing. The wing may be configured to tilt through a range of motion relative to the vehicle body thereby also moving the series of propulsors coupled to the wing. The series of propulsors may be configured to aerodynamically actuate through the range of motion along with the wing due to aerodynamic conditions on the vehicle to change between a hover flight mode and a forward flight mode. In some examples, the wing may be stationary relative to the vehicle body and the control surface may be coupled to the series of propulsor thereby rotating the propulsors when pivoting relative to the wing. In such examples, the series of propulsors may be configured to aerodynamically actuate through the range of motion along with the control surface due to aerodynamic conditions on the vehicle to change between the hover flight mode and the forward flight mode.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the Summary given above and the Detailed Description given below, serve to explain the features of the invention.

DETAILED DESCRIPTION OF THE INVENTION

Figure 1B:
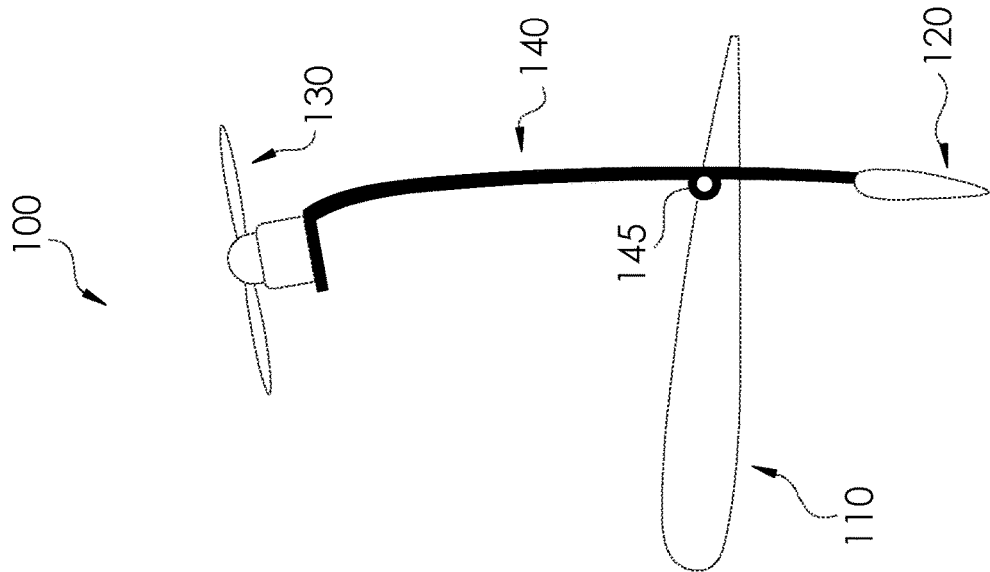
FIGS. 1A and 1B are side, cross-sectional views of a thrust vectoring device in forward flight mode and hover flight mode, respectively, in accordance with one or more aspects of the present disclosure.

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description of various examples of the invention, reference is made to the accompanying drawings which show, by way of illustration, various example systems and environments in which aspects of the present disclosure may be practiced. It is to be understood that other specific arrangements of parts, example systems, and environments may be utilized and structural and functional modifications may be made without departing from the scope of this disclosure.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the present disclosure relate to aerodynamically actuated thrust devices for an advanced vehicle configuration, such as an aircraft with a full cruise capability as well as hover, vertical takeoff and landing ("VTOL"), short takeoff and landing ("STOL"), and/or conventional takeoff and landing ("CTOL"). In this manner, various embodiments may provide vehicles, such as aircraft, that may transition between modes and/or directions using one or more thrust vectoring device actuated only by aerodynamics acting on the vehicle. Certain such aircraft vehicles are described in U.S. patent application Ser. No. 14/121,001; Fredericks et al., AIAA Technical Paper 2012-4324, "Benefits of Hybrid-Electric Propulsion to Achieve 4× Increase in Cruise Efficiency for a VTOL Aircraft"; and Rathhaar et al., AIAA Technical Paper 2014-2999, and "NASA Langley Distributed Propulsion VTOL Tilt Wing Aircraft Testing, Modeling, Simulation, Control, and Flight Test Development," each of which are incorporated by reference herein in its entirety.

Aerodynamically-actuated thrust vectoring devices in accordance with the present disclosure present the ability to vector the thrust on the vehicle so as to transition between different flight modes, efficiently and without mechanical complexity and with a scale free propulsion system.

Aspects of the present disclosure relate to various systems, methods and devices for aerodynamically stable tilt actuation of propulsors, including but not limited to propellers, propeller pylons, jets, wings, fuselages and combinations thereof. Such propulsors according to the present disclosure may be configured to rotate between different flight modes, e.g., between hover and forward flight for tilt-wing or tilt-propulsor aircraft. Propulsion systems which employ such propulsors may be primarily electrically driven, or may alternatively be driven by any other existing propulsion systems. In particular, various embodiments may utilize hybrid electric propulsion to normalize the power across the mission phases and to enable the combustion engine to be sized for wing born flight and batteries may be used to supplement the power required in hover. This may yield an overall lighter propulsion system, which may make for a smaller aircraft, which may lead to lower costs.

Major hinge lines of larger tilting bodies as described and illustrated herein may have no mechanically driven actuation, such as hinge lines between a fixed wing and a rotatable propulsor coupled thereto. Springs and/or dampers may optionally be employed with moving or rotatable propulsors according to the present disclosure, thereby providing passive restorative or stabilizing moments. Accordingly, lifting and propulsion systems or propulsors may use aerodynamic forces and moments to adjust the lift or force vectors of the associated body (e.g., wing, tail, fuselage). In certain aspects, rotation of the tilting body may be invoked passively via the tilting body interacting with freestream velocity. Small trailing edge surfaces (e.g., control surfaces, trailing edge flaps) may provide mechanisms for controlled aerodynamic torque production, which may be dependent on free stream conditions and propeller downwash.

In accordance with aspects of the present disclosure, aerodynamic thrust vector actuation may be invoked via two different methods. First, aerodynamic thrust vector actuation may be invoked via adjustment of a control surface that rotates with the propulsor. Such adjustment may be a principally fixed setting similar to flap settings on conventional aircraft, as compared to a constant varying control signal to command orientation of the propulsor. Second, aerodynamic thrust vector actuation may be invoked via proper sizing of the chord length of the control surface relative to the center of gravity of the propulsor. Thus, before takeoff and with no forward speed, the weight of the control surface relative to the propulsor may cause rotation of the unit to the hover orientation, e.g., with the propulsor rotated vertically upward relative to the wing and/or aircraft body. In forward flight, the lift of the control surface may rotate the propulsor to the forward flight orientation. Thus a vehicle in accordance with the present disclosure may transition from a hovering flight condition to a wing born flight condition without direct tilting-wing-body or tilting-thrust-vector mechanical actuation and without complex control systems. Specifically, the transition corridor between the hovering flight condition and the wing born flight condition may be directly addressed in early concept design as a passive feature of the aircraft (e.g., size and weight of the propulsor and the control surface, chord length at which the system is coupled, etc.). Systems in accordance with the present disclosure may result in weight and complexity reduction and may thereby enable more robust, naturally stable hovering aircraft with efficient forward flight modes.

According to aspects of the present disclosure, an aircraft may passively and stably respond to abrupt changes in the freestream velocity, such as gusts, vortices, shears, and the like. Such a response may be accomplished by design of the aerodynamic center and the center of gravity (CG) of the tilting body and associated component such that abrupt changes in the freestream velocity may cause a stabilizing thrust vectoring rotation of the tilting body. In particular, a CG forward of a pivot point may result in a stabilizing response to abrupt accelerations on the tilting body. An AC aft of the pivot point may result in a stabilizing response to aerodynamic loading by pointing thrust vectoring rotation of the tilting body toward a gust direction. Accordingly, a vehicle in accordance with the present disclosure may be capable of being piloted without any dampers (e.g., similar to conventional helicopter piloting and control) or with only simple damper stabilization about the vehicle attitude axes.

Aerodynamically actuated thrust vectoring devices in accordance with the present disclosure may be designed based on a combination of design considerations, including but not limited to the tilting body CG, center of lift, propulsor normal force, propulsor pitching moment, pivot point location, pivot point spring stiffness and damping, in order to create generally passive thrust vectoring devices combined to provide the appropriate forces and moments to invoke TV actuation and vehicle transition.

The various thrust vectoring device embodiments employed in vehicle configurations may combine advanced vehicle configurations with tilting wings and/or propulsors to accomplish thrust vectoring necessary to change flight modes. In this manner, various embodiments may provide vehicles, such as aircraft, capable of efficient flight mode transitioning without complex mechanically and/or electrically actuated thrust vectoring devices. Aerodynamically actuated thrust vectoring devices in accordance with one or more aspects of the present disclosure may provide various efficiencies, such as reduced energy consumption during transition of flight modes. The various embodiments may also provide the ability to provide favorable passive responses to various atmospheric disturbances.

The present disclosure relates to aerodynamic actuated thrust vectoring devices for providing semi-rigid actuation between two rotating or tilting bodies of an aircraft vehicle. In particular, the use of semi-rigid actuation, e.g., servomechanisms or ball-screws, between tilting bodies on an aircraft vehicle, e.g., tilt-wing or tilt-propulsor, may couple the inertias of the tilting bodies together and transmit responses to atmospheric disturbances, such as gusts, wind shears, and the like. Employing aerodynamically actuated thrust vectoring devices as described herein may result in favorable passive responses to atmospheric disturbances, elimination of actuator mass, and/or a more robust and higher performing aircraft. Further, certain axes of an aircraft vehicle body in accordance with aspects described herein may be decoupled, thus allowing for a more robust and higher performing aircraft design. Primarily passive aerodynamically actuated thrust vectoring according to aspects described herein may allow for enhanced design freedom, thereby enabling new performance and robustness opportunities for Personal Air Vehicles (PAVs) as well as Unmanned Aerial Vehicles (UAVs).

Figure 1A:
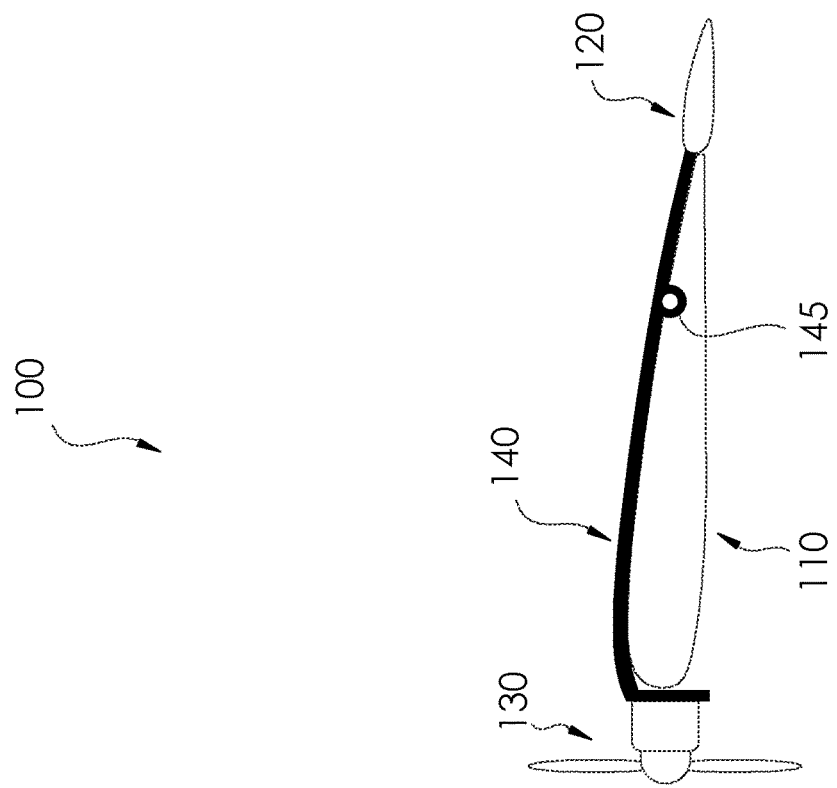

Referring to FIGS. 1A and 1B, a thrust vectoring device 100 is illustrated in a side, cross-sectional view. Wing 110 is provided along with control surface 120 (e.g., a trailing edge flap), which is pivotably attached to wing 110 and configured to tilt, rotate or translate about a range of motion. Propeller unit 130 is provided at a leading edge of wing 110, i.e. a forward-facing propeller unit, as shown in FIG. 1A. Propeller unit 130 may include any number of components associated with a propeller or other similar propulsor, including but not limited to propeller blade, a propeller hub, a motor which drives rotation of the propeller blades, and the like. Propeller unit 130 is connected to the control surface 120 via a pylon or connecting member 140.

FIGS. 1A and 1B illustrate a passively tilted propeller pylon (i.e., connecting member 140) where the trailing edge surface provides moments to align the connecting member 140 with the relative wind or optionally a downwash angle, depending on placement of pivot point 145 along wing 110. Connecting member 140 causes propeller unit 130 to rotationally move along with movement of the control surface 120 by being anchored to wing 110 at pivot point 145 such that propeller unit 130 may rotate between a first position associated with a takeoff or hover flight mode (as shown in FIG. 1B) and a second position associated with a cruise or forward flight mode (as shown in FIG. 1A).

Accordingly, propeller unit 130 may be aerodynamically actuated between the first position as shown in FIG. 1B to the second position shown in 1A. Such capabilities may depend on proper sizing of the various features of thrust vectoring device 100 relative to each other. In particular, a location of pivot point 145 along a chord length of wing 110 may be selected based on respective sizes of the propeller unit 130 and the control surface 120, the chord length, camber and thickness of the wing 110, and the like. For example, thrust vectoring device 100 may be configured such that the pivot point 145 is located aft of the center of gravity of wing 110 and forward of the aerodynamic center of wing 110. In such a configuration, prior to takeoff, a weight of the control surface 120 may push the propeller unit 130 to the first position as shown in FIG. 1B. Freestream conditions, e.g., lifting forces about the wing 110, after takeoff may push the control surface 120 upward, thereby pushing the propeller unit 130 downward to the first position as shown in FIG. 1A.

As shown in FIG. 1A, when the propeller unit 130 is in the second position, for a forward flight mode, a portion of the connecting member 140 between the propeller unit 130 and the pivot point 145 may be designed to rest on an upper surface of wing 110. In some embodiments, portions of the connecting member 140 may have a shape corresponding to the shape of the upper surface of wing 110, e.g., such that portions of the connecting 140 arm fit flush with or substantially flush with the upper surface of wing 110. A notch may be removed from a portion of wing 110 between the pivot point 145 and the trailing edge of the wing 110, such that portions of the connecting member 140 aft of the pivot point 145 may be positioned above a top surface or within a thickness of wing 110 when the propeller unit 130 is in the second position shown in FIG. 1A and be positioned below wing 110 when the propeller unit 130 is in the first position as shown in FIG. 1B. In some examples, thrust vectoring device may include one or more springs (not pictured) which may be configured to better tailor the moments on the thrust vectoring device 100.

Figure 2A:
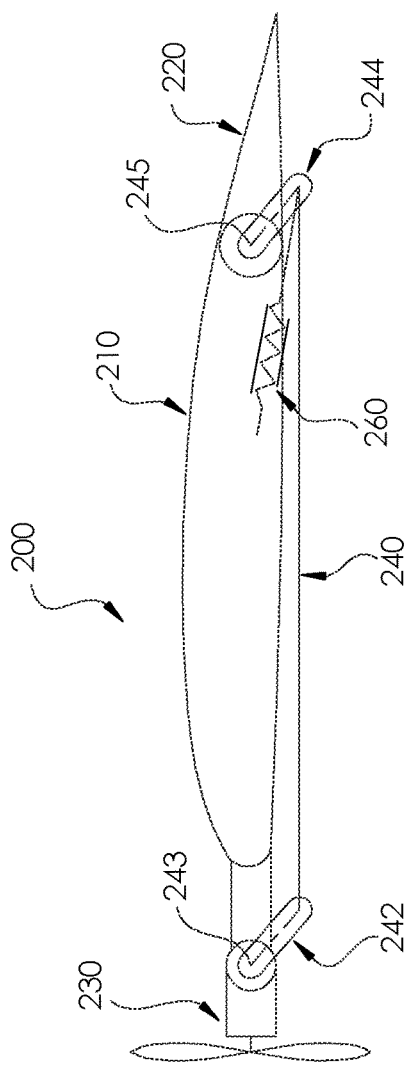
FIGS. 2A and 2B are side, cross-sectional views of a thrust vectoring device in forward flight mode and hover flight mode, respectively, in accordance with one or more aspects of the present disclosure.
Figure 2B:
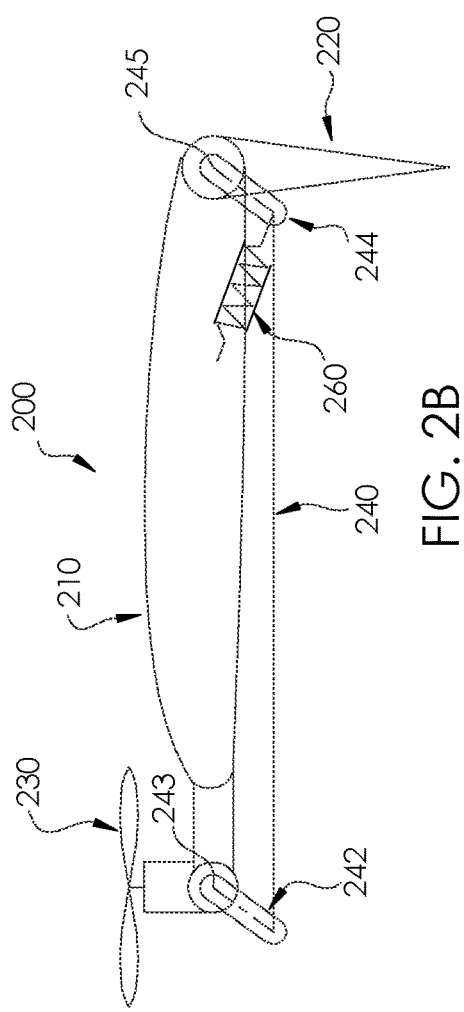

FIGS. 2A and 2B show a thrust vectoring device 200 similar to thrust vectoring device 100 of FIGS. 1A and 1B. Specifically, thrust vectoring device 200 includes wing 210 coupled to a control surface 220 at a trailing edge of wing 210 and configured to pivot about the wing 210 at pivot point 245. Propeller unit 230 is provided at a leading edge of wing 210 (i.e., a forward-facing propeller unit). Linkage 240 may connect propeller unit 230 to control surface 220 along a lower surface of wing 210 via pivot point 243 and lever arm 242 at propeller unit 230 and pivot point 245 and lever arm 244 at control surface 220. Accordingly, propeller unit 230 may be actuated from a first position associated with a takeoff or hover flight phase as shown in FIG. 2B to a second position associated with a cruise or forward flight phase as shown in FIG. 2A, when control surface is pushed upward and around pivot point 245 due to freestream conditions on the wing 210. Unlike the configuration of FIGS. 1A and 1B, control surface 220 stays connected at one end to wing 210 at pivot point 245. A spring/damper device 260 may be included to provide passive restorative or stabilizing moments to the actuation of the propeller unit 230.

Thrust vectoring devices described above being coupled to a wing, such as thrust vectoring device 100 or thrust vectoring device 200 may, in some examples, alternatively be coupled to a fuselage member, such as a fuselage having a flap or canard coupled to the propulsor.

Figure 3A:
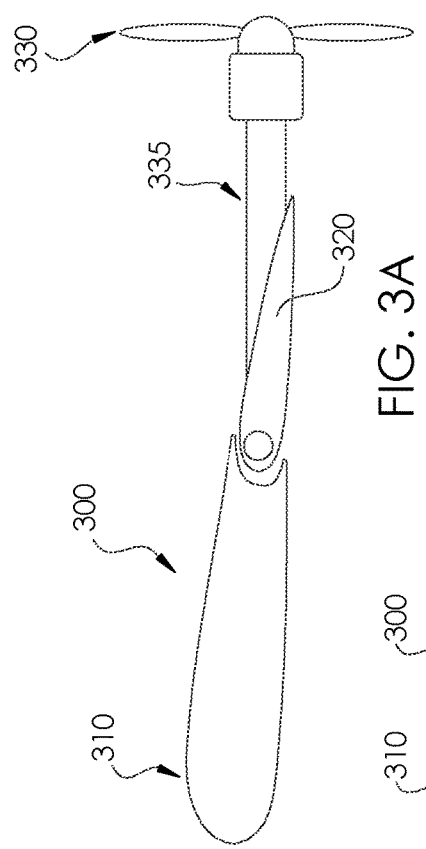
FIGS. 3A and 3B are side, cross-sectional views of a thrust vectoring device in forward flight mode and hover flight mode, respectively, in accordance with one or more aspects of the present disclosure.
Figure 3B:
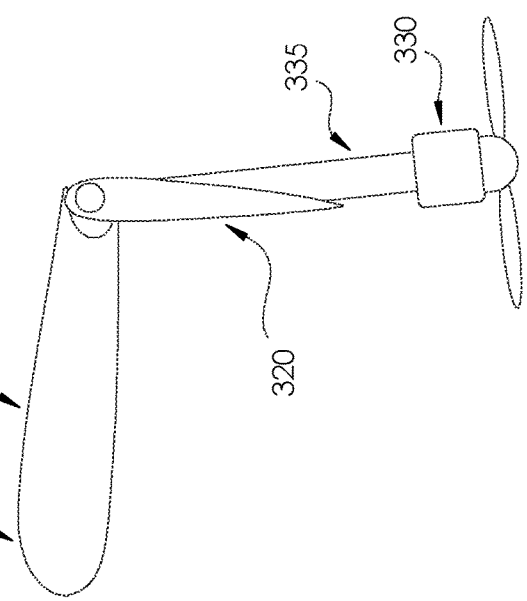

Thrust vectoring device 300 of FIGS. 3A and 3B is similar to thrust vectoring device 100 of FIGS. 1A and 1B and thrust vectoring device of FIGS. 2A and 2B, except for the provision of a rear-facing propeller unit 330 directed coupled, e.g., rigidly attached, to a portion of control surface 320 which is configured to pivot about wing 310. In particular, a propeller shaft 335 may extend from the control surface such that the propeller unit 330 is positioned aft of the control surface.

With a propulsion system, e.g., the propeller unit 330, being located at a trailing edge of wing 310 (and wing 310 not being configured to tilt about an associated vehicle body), increased circulation may be provided in the hover flight mode and through transition from the hover flight mode to the forward flight mode. Further, normal forces and pitching moments on propeller unit 330 may provide stabilizing moments to align the propeller unit 330 with a downwash angle of wing 310 through transition from the hover flight mode to the forward flight mode.

In one or more of the above-described configurations, a locking mechanism or clutch may be employed as part of the thrust vectoring device to mechanically hold a propulsor or propeller unit in a particular position.

In some aspects, an aircraft vehicle may be provided that employs one or more of the above-described thrust vectoring devices. In an embodiment, an aircraft may have one or more propellers or propeller units, such as one, two, three, four, five, six, seven, eight, nine, or ten or more propellers, and one or more electric motors may distribute thrust across the propellers. For example, the electric motors may distribute thrust across ten propellers. In an embodiment, propellers may be mounted to the leading edge of the wing of the aircraft and mounted to the leading edge of the tail of the aircraft. In another embodiment, propellers may be mounted at the trailing edge of the wing of the aircraft and mounted at the trailing edge of the tail of the aircraft. The number of propellers mounted to the leading or trailing edge of the wing of the aircraft and the leading or trailing edge of the tail of the aircraft may vary. In some examples, a number of propeller provided may correspond to a number are control surfaces which are coupled to the propellers as described herein. In some examples, more than one propeller may be coupled to each control surfaces, such that there may be a multiple, e.g., 2, 3, or 4, of propellers provided per control surface.

In an embodiment, at least a portion of the wing of the aircraft and at least a portion of the tail of the aircraft may both tilt to transition the aircraft between hovering flight and wing born flight. In an embodiment, the wing of the aircraft and the tail of the aircraft may both rotate around the lateral axis of the wing and tail, respectively, to tilt the wing and tail through a range of motion, thereby pitching the wing and tail up and/or down relative to the longitudinal axis of the aircraft to transition the aircraft between hovering flight, or in some examples, the VTOL phase, and wing born flight, i.e., the wing born flight phase. The range of motion may be any range of motion, such as less than 90 degrees, 90 degrees, approximately 90 degrees, greater than 90 degrees, etc. The tilting portions of the wing of the aircraft and the tail of the aircraft may tilt together or independently and may tilt to the same or different orientations in their respective ranges of motion.

Figure 4:
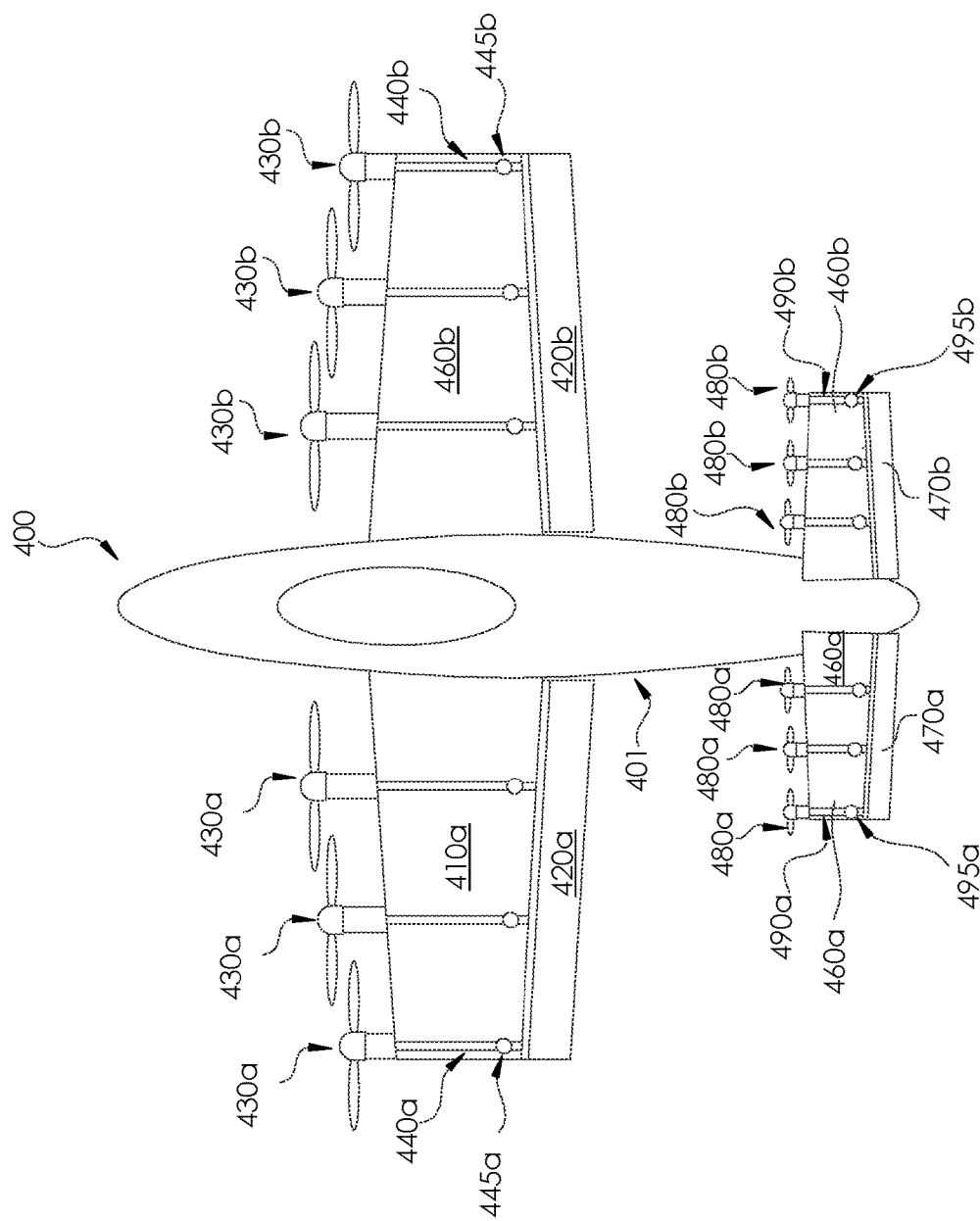
FIG. 4 is a top view of a vehicle employing thrust vectoring devices in accordance with one or more aspects of the present disclosure.

For example, FIG. 4 illustrates a vehicle 400 that includes thrust vectoring devices, e.g., similar to thrust vectoring device 100 of FIGS. 1A and 1B. In particular, vehicle body 401 and a pair of wings 410a, 410b attached to opposing sides of vehicle body 401 may be provided with vehicle 400. Each wing 410a, 410b may include a series of front-facing propeller units 430a, 430b at a leading edge region of the wings 410a, 410b as well a control surfaces 420a, 420b (e.g., trailing edge flaps). Connecting members 440a, 440b may be employed to couple the propeller units 430a, 430b with respective control surfaces 420a, 420b and pivotably attached to the wings 410a, 410b at respective pivot points 445a, 445b. Accordingly, propeller units 430a, 430b may each be configured to aerodynamically actuate through a range of motion relative to the pivot points 445a, 445b on wings 410a, 410b due to aerodynamics and freestream conditions around the vehicle 400 so as to change between a takeoff or hover flight mode and a forward flight mode.

Vehicle 400 may further include a tail 460a, 460b with respective front-facing propeller units 480a, 480b, trailing edge control surfaces 470a, 470b and connecting members 490a, 490b coupled to the tail 460a, 460b at respective pivot points 495a, 495b. Such propeller units may be configured to aerodynamically actuate through the range of motion, e.g., in a similar manner as propeller units 530a, 530b.

Figure 5:
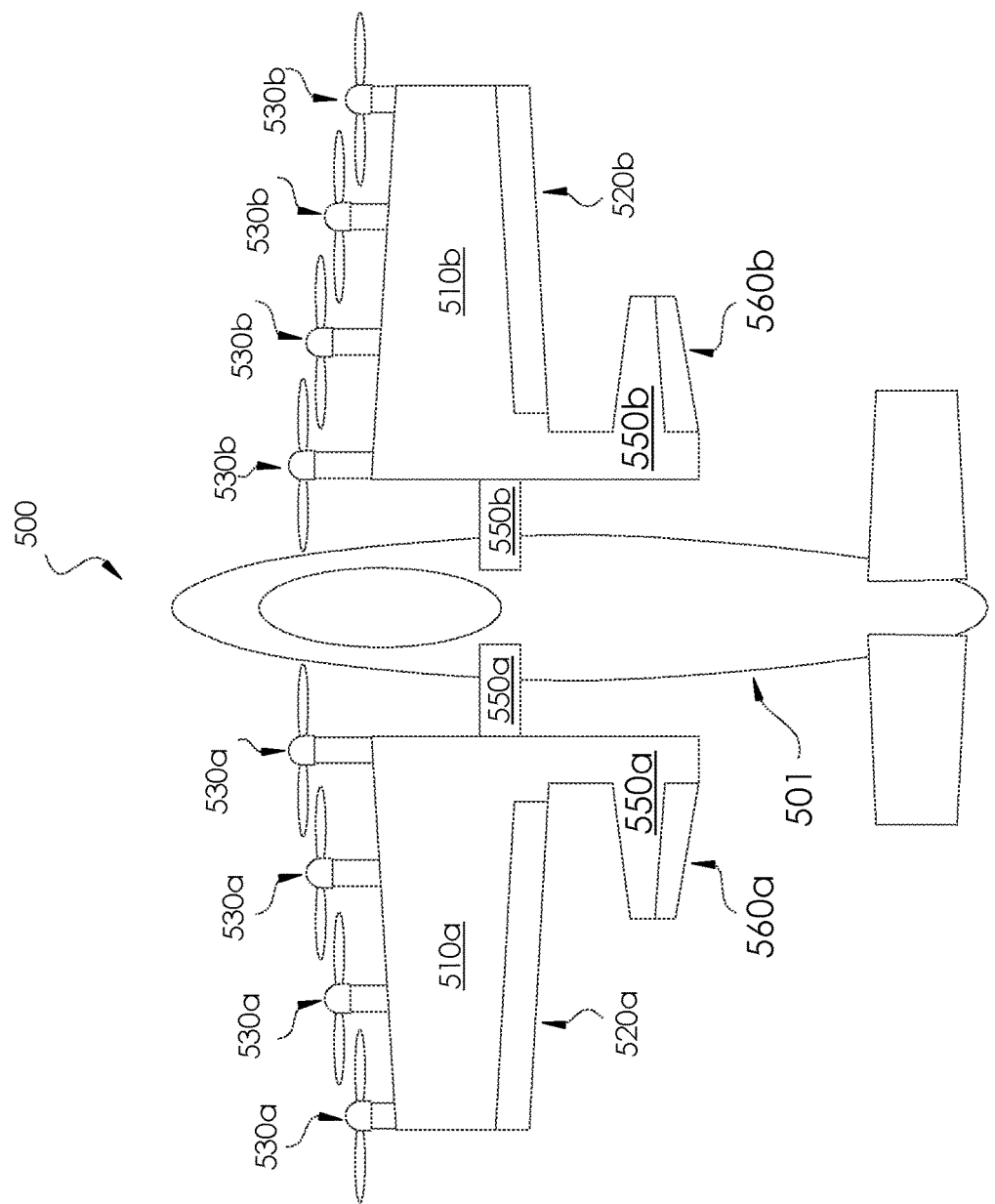
FIG. 5 is a top view of a vehicle employing thrust vectoring devices in accordance with one or more aspects of the present disclosure.

Aspects of the present disclosure may relate to tilt-wing aircraft vehicles. For example, and as shown in FIG. 5, vehicle 500 include vehicle body 501 and a pair of tilt-wings 510a, 510b configured to tilt through a range of motion relative to vehicle body 501 via rotational shafts 505a, 505b, so as to enable vehicle 500 to operate in a takeoff or hover flight condition as well as a cruise or forward flight condition. As such, wings 510a, 510b may include one or more propulsors 530a, 530b, e.g., propeller units) rigidly attached to wings 510a, 510b such that the wings 510a, 510b move as a single piece through the range of motion. Further, control surfaces 520a, 520b may be included in vehicle 500 and may tilt about wings 510a, 510b independent of movement of the one or more propulsors 530a, 530b. Wings 510a, 510b may include rear canards 550a, 550b, e.g., coupled near trailing edge sides of wings 510a, 510b, which may also include respective control surfaces 560a, 560b. In such configuration rear canards 550a, 550b may move as one piece with the wings 510a, 510b. Rear canards 550a, 550b may also include control surfaces 560a, 560b configured to pivot through a range of motion similar to control surfaces 520a, 520b on wings 510a, 510b.

In some examples a first wing 510a may be configured to tilt independent of a second wing 510b, so as to improve various maneuver capabilities of vehicle 500. Further a damper and/or spring may be provided at the rotational shafts 505a, 505b so as to stabilize movement of wings 510a, 510b through the range of motion.

In some examples, vehicle body 501 (e.g., a fuselage) may be designed to tilt slightly nose down in the hover condition to provide enhanced pilot visibility. An angle of vehicle body 501 may not necessarily be actively controlled in hover, but may passively hang relative to wings 510a, 510b, such that only the wing body is actively stabilized. In the forward flight mode, an angle of vehicle body 501 may be controlled via a conventional elevator control surface. In some examples, wings 510a, 510b may be locked or clutched in place during the forward flight mode.

Figure 6:
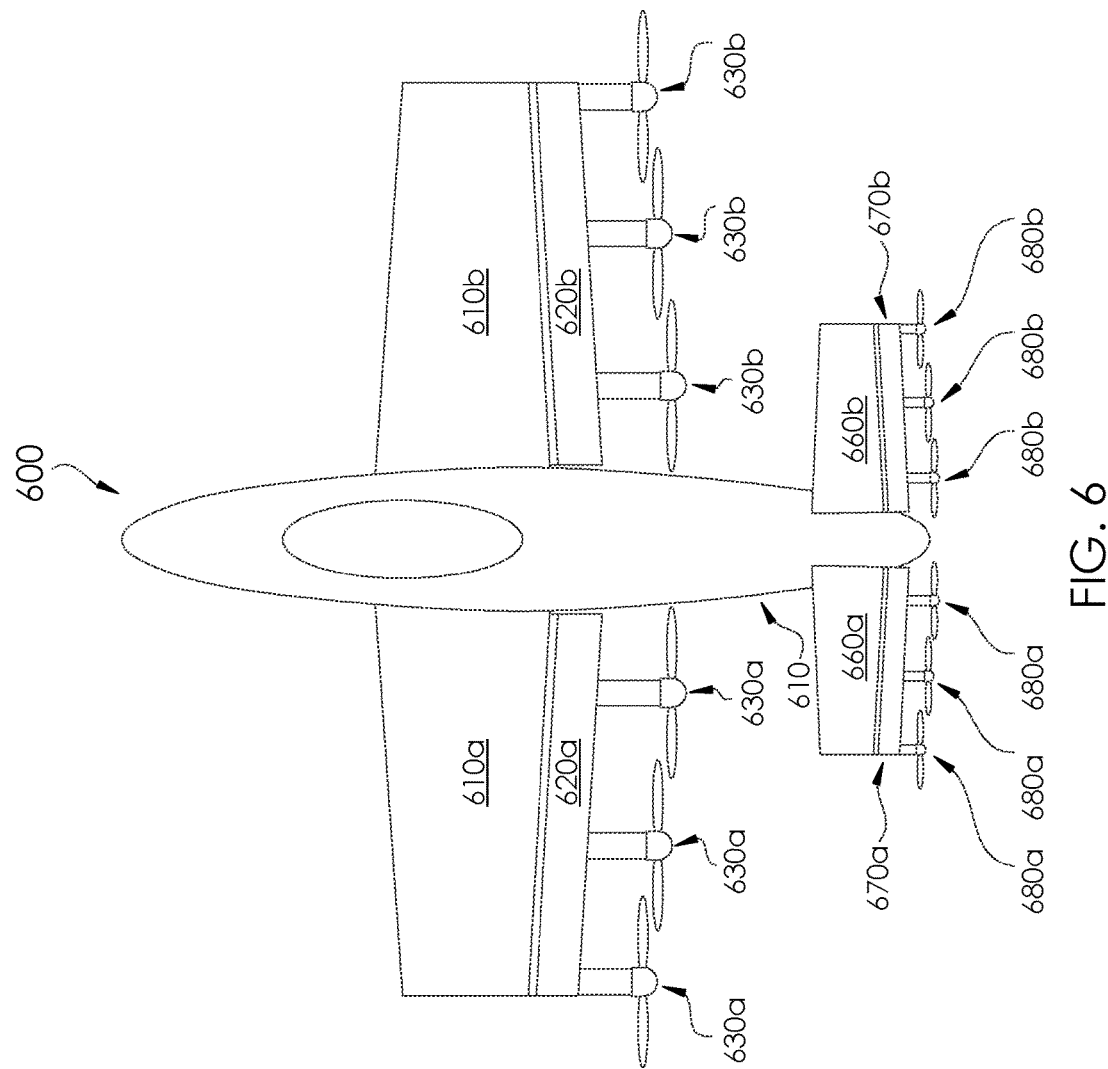
FIG. 6 is a top view of a vehicle employing thrust vectoring devices in accordance with one or more aspects of the present disclosure.

FIG. 6 illustrate an aircraft vehicle 600 employing rear-facing propeller units 630a, 630b, e.g., similar to propeller unit 330 of FIGS. 3A and 3B. Also similar to thrust vectoring device 300 of FIGS. 3A and 3B, propeller units 630a, 630b may be directly coupled to control surfaces 620a, 620b which are pivotably coupled to wings 610a, 610b. Similar to rear-facing propeller unit 330 of FIGS. 3A and 3B, propeller units 630a, 630b may be aerodynamically actuated between a first position associated with a takeoff or hover flight mode and a second position associated with a cruise or forward flight mode via the direct coupling to the control surfaces 620a, 620b which pivot about the wings 610a, 610b based on freestream conditions.

Vehicle 600 may further include a horizontal tail 660a, 660b with control surfaces 670a, 670b coupled to the trailing edge thereof. A series of rear-facing tail propeller units 680a, 680a may be directly coupled to control surfaces 670a, 670b. Similar to the wing propeller units 630a, 630b, tail propeller units 680a, 680b may be aerodynamically actuated between a first position associated with a takeoff or hover flight mode and a second position associated with a cruise or forward flight mode via the direct coupling to the control surfaces 670a, 670b which pivot about the tail 660a, 660b based on freestream conditions.

Figure 7:
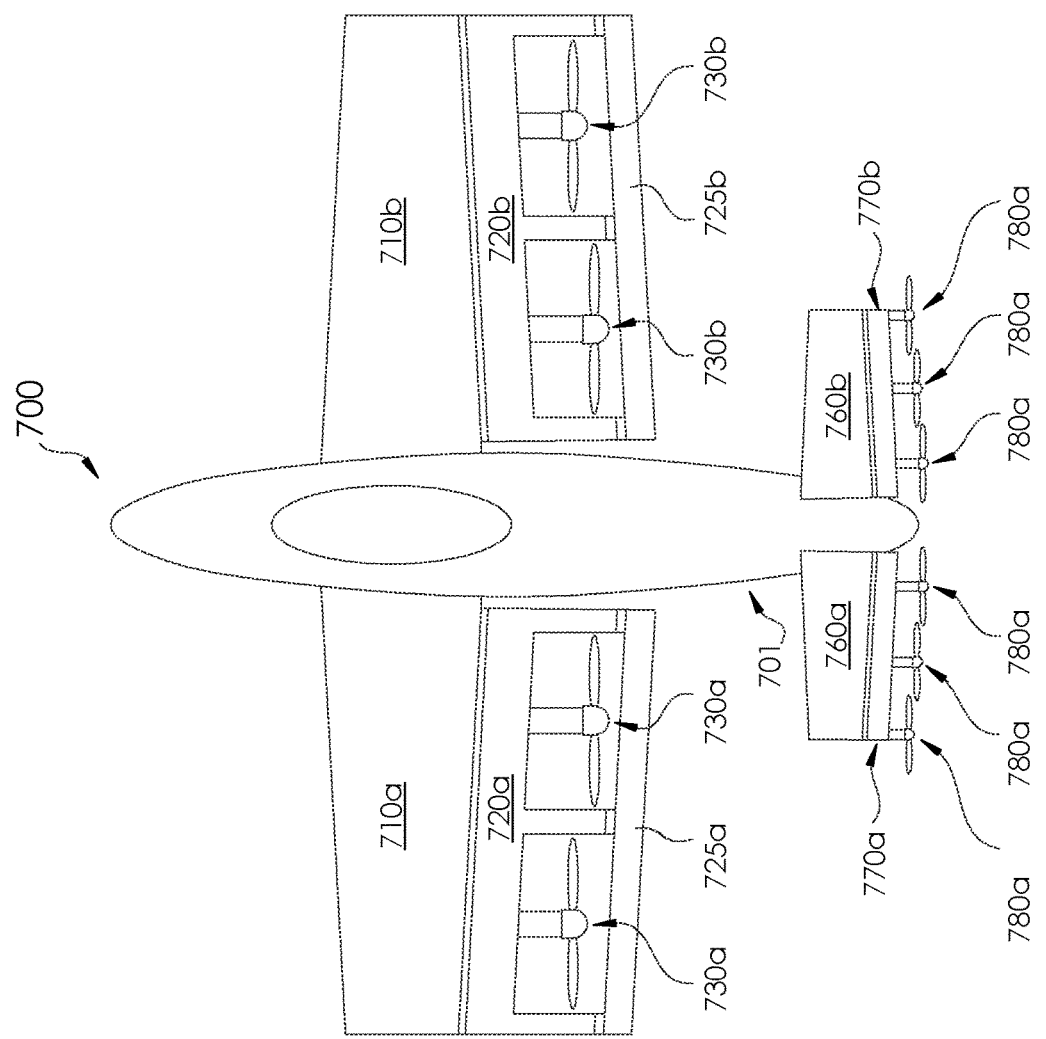
FIG. 7 is a top view of a vehicle employing thrust vectoring devices in accordance with one or more aspects of the present disclosure.

FIG. 7 illustrates an aircraft vehicle 700 with many features similar to features of aircraft vehicle 600 of FIG. 6. In particular, rear-facing propeller units 730a, 730b may be directly coupled to control surfaces 720a, 720b which may be pivotably coupled to wings 710a, 710b. Propeller units 730a, 730b may be aerodynamically actuated between a first position associated with a takeoff or hover flight mode and a second position associated with a cruise or forward flight mode via the direct coupling to the control surfaces 720a, 720b which pivot about the wings 710a, 710b based on freestream conditions. Vehicle 700 may further include a horizontal tail 760a, 760b with control surfaces 770a, 770b coupled to the trailing edge thereof. A series of rear-facing tail propeller units 780a, 780a may be directly coupled to control surfaces 770a, 770b. Similar to the wing propeller units 730a, 730b, tail propeller units 780a, 780b may be aerodynamically actuated between a first position associated with a takeoff or hover flight mode and a second position associated with a cruise or forward flight mode via the direct coupling to the control surfaces 770a, 770b which pivot about the tail 760a, 70b based on freestream conditions. As shown in FIG. 7, vehicle 700 further includes additional wing control surfaces, torque flaps 725a, 725b aft of propeller units 730a, 730b which may be configured to provide additional aerodynamic thrust vectoring of wing propeller units 730a, 730b due to freestream conditions.

Figure 8B:
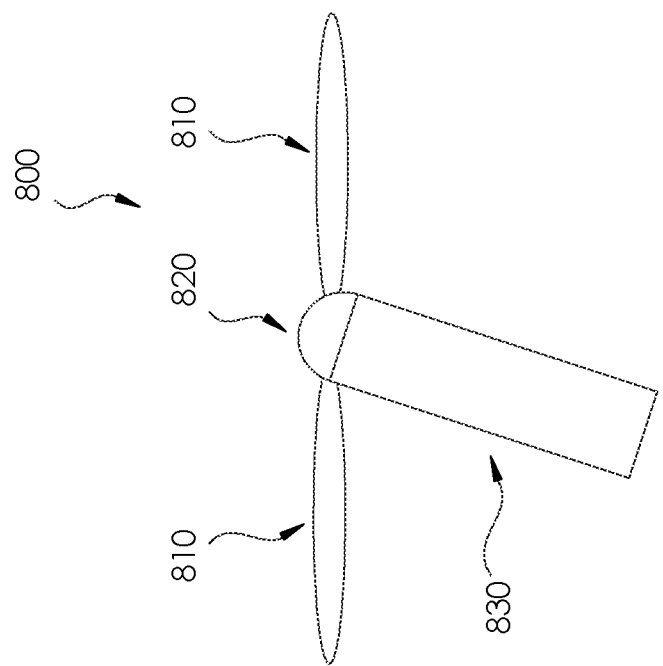
FIGS. 8A and 8B are schematic top views of a propeller unit employed in thrust vectoring devices in accordance with one or more aspects of the present disclosure.
Figure 8A:
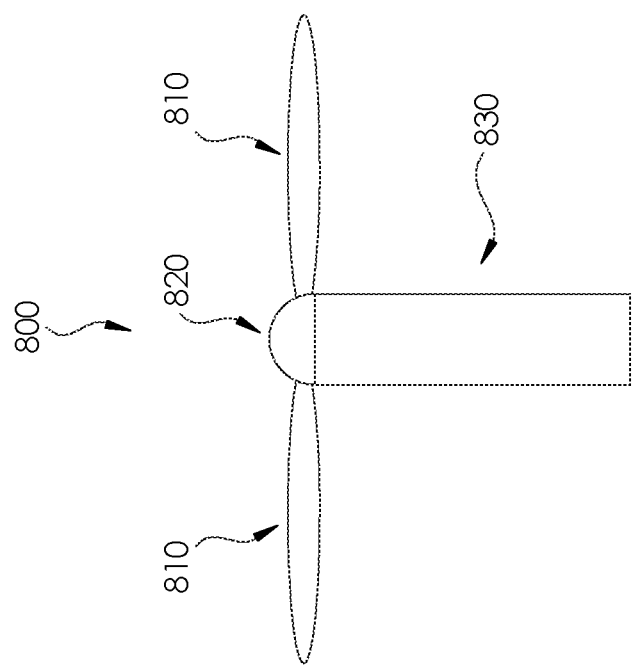

Any of the above-described propeller units may employ hinged rotor blade. As shown in FIGS. 8A and 8B, a propeller unit 800 is illustrated including propeller blades 810, hub 820 and propeller shaft 830. Propeller blades 810 may be hinged at or near the blade root, i.e. at hub 820 to provide additional passive stability in the hover flight mode. For example as shown in FIG. 8A, in the hover flight mode, propeller shaft 830 may be designed to be aligned in a vertical direction with propeller blades 810 being positioned orthogonal to the direction of the length of the propeller shaft. A disturbance in freestream condition which may cause portions of the vehicle, e.g., the propeller shaft 830 to tilt as shown in FIG. 8B relative to a vertical direction associated with the hover flight condition. While the disturbance may cause propeller shaft 830 to tilt, the orientation of propeller blades 810 is nonetheless maintained. Accordingly, such hinged rotor blade configurations may provide enhanced flight stability for vehicle in accordance with aspects of the present disclosure.

The applications for the various aerodynamically actuated thrust vectoring devices for aircraft capable of vertical takeoff and landing as well as cruise flight conditions are numerous. Applications may for Unmanned Aerial Vehicle (UAV) missions range from military reconnaissance missions, to police and fire department surveillance roles, to crop or wildlife monitoring or related science missions, to civilian automated door to door package delivery (e.g., mail, prescription drugs, food, etc.), to air taxi services. For example, systems according to the present disclosure may offer significant efficiency improvements over current aircraft that only fly in hover mode, which are typically limited to speeds of about 30 miles per hour and ranges on the order of about 10 miles.

A transitioning aircraft, e.g., a VTOL or STOL aircraft, in accordance with the present disclosure may offer up to 4 times faster speed improvements and/or 4 times farther range improvements over current aircraft. In other words, for applications involving package deliveries, systems in accordance which the present disclosure may provide a reduction in a number of warehouses by 16 times based on the above speed and range improvements. Further, systems according to the present disclosure also offer improvements over known transitioning VTOL aircraft, which offer poor robustness to inclement weather conditions and/or inefficient airframes. All these applications that require flight transitioning operations would have an aircraft with 4 times the endurance compared to conventional implementations and have improved robustness in windy environments. Accordingly aircraft as described herein offers improved robustness and enhanced speed and range capabilities, which are critical parameters for many of the above-described UAV missions.

Another significant application area for aerodynamically actuated thrust vectoring devices according the present disclosure includes Personal Air Vehicles (PAV) missions. Current personal VTOL transport vehicles may employ active thrust vectoring, such as mechanically actuated thrust vectoring systems or differential thrust systems for control in off-nominal conditions, such as gusty environments.

All references contained herein are hereby incorporated by reference in their entirety.

In keeping with the foregoing discussion, the term "propulsor" is intended to encompass the various components configured to rotate, tilt, and/or move to cause the vehicle to transition between various flight modes, vis-à-vis the methods and examples of the present disclosure. For example, propulsors as discussed herein may include propellers, rotors, fans, ducted fans, or other thrust generating devices that generate air.

While preferred embodiments and example configurations of the invention have been herein illustrated, shown and described, it is to be appreciated that various changes, rearrangements and modifications may be made therein, without departing from the scope of the invention as defined by the claims. It is intended that specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention.

While the invention has been described with respect to specific examples including presently preferred modes of carrying out the invention, those skilled in the art will appreciate that there are numerous variations, combinations, and permutations of the above described systems and methods. Those skilled in the art will understand that various specific features may be omitted and/or modified in without departing from the invention. Thus, the reader should understand that the spirit and scope of the invention should be construed broadly as set forth in the appended claims.

What is claimed is:

1. A vehicle comprising:
   a wing;
   a control surface pivotably coupled to the wing and configured to pivot about a range of motion; and
   a propulsor coupled to the control surface and configured to rotate between a first position associated with a hover flight mode and a second position associated with a forward flight mode,
   wherein the propulsor is aerodynamically actuated between the first position and the second position due to aerodynamics about the wing.

2. The vehicle of claim 1, further comprising a connecting member connecting the propulsor to the control surface such that movement of the control surface about the range of motion produces rotation of the propulsor.

3. The vehicle of claim 2, Wherein the connecting member is coupled to the control surface at a first end and coupled to the propulsor at a second end, and wherein the connecting member is coupled to the wing at a pivot point at a location of the connecting member between the first end and the second end.

4. The vehicle of claim 3, wherein the pivot point is located aft of a center of gravity of the wing and forward of an aerodynamic center of the wing.

5. The vehicle of claim 3, wherein the pivot point is positioned at a chord length location of the wing based on a weight of the propulsor and a weight the control surface and a length of the connecting member.

6. The vehicle of claim 5, wherein a portion of the connecting member forward of the pivot point is configured to lie flush with an upper surface of the wing and wherein the wing comprises a notch sized to fit a portion of the connecting member aft of the pivot point.

7. The vehicle of claim 2, wherein the control surface is a trailing edge flap.

8. A vehicle comprising:
   a vehicle body;
   a tilting body configured to move through a range of motion relative to the vehicle body; and
   a series of propulsors coupled to the vehicle body and configured to rotate between a first position associated with a hover flight mode and a second position associated with a forward flight mode,
   wherein the series of propulsors are configured to aerodynamically actuate through the range of motion along with the tilting body due to aerodynamics about the tilting body to change between the first position and the second position.

9. The vehicle of claim 8, further comprising:
   a tail including a tail control surface configured to tilt through a range of motion relative to the tail and a series of tail propulsors coupled to the tail and configured to rotate between a first position associated with a hover flight mode and a second position associated with a forward flight mode,
   wherein the series of tail propulsors are configured to aerodynamically actuate through the range of motion along with the tail due to aerodynamics about the tail to change between the first position and the second position.

10. The vehicle of claim 8, wherein the series of propulsors are configured to be positioned in the first position prior to takeoff due to weights of the tilting body and the series of propulsors.

11. The vehicle of claim 8, wherein the series of propulsors are configured to be positioned in the second position during forward flight due to lifting forces acting on the tilting body.

12. A thrust vectoring device comprising:
   a control surface configured to pivot about a range of motion; and
   a propulsor coupled to the control surface and configured to rotate between a first position associated with a hover flight mode and a second position associated with a forward flight mode,
   wherein the propulsor is aerodynamically actuated between the first position and the second position due to aerodynamic conditions about the control surface.

* * * * *